United States Patent

Ishiwata et al.

[11] Patent Number: 5,858,482
[45] Date of Patent: Jan. 12, 1999

[54] LIQUID CRYSTAL DEVICE AND PROCESS FOR PRODUCTION THEREOF

[75] Inventors: Kazuya Ishiwata, Yokosuka; Kenji Onuma, Isehara; Yasuyuki Watanabe, Atsugi, all of Japan

[73] Assignee: Canon Kabushiki Kaisha, Tokyo, Japan

[21] Appl. No.: 900,293

[22] Filed: Jul. 25, 1997

[30] Foreign Application Priority Data

Jul. 26, 1996 [JP] Japan .................................. 8-197956

[51] Int. Cl.⁶ ............................................... G02F 1/1339
[52] U.S. Cl. .......................... 428/1; 349/122; 349/153; 349/154; 349/155; 349/157
[58] Field of Search ................... 428/1; 349/155, 349/122, 157, 154, 153

[56] References Cited

U.S. PATENT DOCUMENTS

| | | | |
|---|---|---|---|
| 4,802,743 | 2/1989 | Takao et al. | 350/339 F |
| 4,971,829 | 11/1990 | Komura et al. | 427/27 |
| 5,054,890 | 10/1991 | Hanyu et al. | 350/344 |
| 5,078,475 | 1/1992 | Sekimura et al. | 359/68 |
| 5,150,239 | 9/1992 | Watanabe et al. | 359/80 |
| 5,268,780 | 12/1993 | Hanyu et al. | 359/75 |
| 5,270,846 | 12/1993 | Watanabe et al. | 359/74 |
| 5,282,070 | 1/1994 | Nishida et al. | 359/67 |
| 5,316,805 | 5/1994 | Hanyu et al. | 428/1 |
| 5,353,141 | 10/1994 | Onuma et al. | 359/76 |
| 5,381,256 | 1/1995 | Hanyu et al. | 359/75 |
| 5,400,159 | 3/1995 | Takao et al. | 359/76 |
| 5,412,494 | 5/1995 | Ishiwata et al. | 359/67 |
| 5,475,515 | 12/1995 | Yoshinaga et al. | 359/52 |
| 5,479,284 | 12/1995 | Watanabe et al. | 359/80 |

FOREIGN PATENT DOCUMENTS 0406705  1/1991  European Pat. Off. .

Primary Examiner—Alexander Thomas
Attorney, Agent, or Firm—Fitzpatrick, Cella, Harper & Scinto

[57] ABSTRACT

A liquid crystal device is formed of a pair of substrates oppositely disposed with adhesive particles dispersed between the substrates, a sealing member disposed along a periphery of the substrates while leaving a liquid crystal injection port to be later sealed, and a liquid crystal disposed in a region surrounded by the sealing member and the liquid crystal injection port later sealed. In the device, the region surrounded by the sealing member for disposing the liquid crystal is divided into a rectangular first region for effective optical modulation and a second region surrounding the first region not contributing to substantial optical modulation, and the adhesive particles are disposed in a dispersed state in the first region and selectively at a portion of the second region in proximity to the injection port so as to minimize a cell gap distribution and provide a broader drive margin temperature characteristic.

29 Claims, 6 Drawing Sheets

LIQUID CRYSTAL DEVICE AND PROCESS FOR PRODUCTION THEREOF

FIELD OF THE INVENTION AND RELATED ART

The present invention relates to a liquid crystal device comprising a pair of substrates disposed opposite to each other with adhesive particles dispersed therebetween and a process for producing such a liquid crystal device, particularly a manner of dispersion and disposition of such adhesive particles.

In a liquid crystal device wherein a liquid crystal is sandwiched between a pair of oppositely disposed substrates, it is important to maintain a uniform cell gap which is a substantial spacing filled with the liquid crystal. However, in a liquid crystal device of the TN- or STN-mode having a relatively large cell gap, a fluctuation in cell gap is less liable to be a serious defect. For example, in a liquid crystal device having a cell gap of 6 $\mu$m, a cell gap change of 0.2 $\mu$m makes a fluctuation of ca. 3%, which may not exert seriously adverse effect on the drive performance.

However, for a liquid crystal device using a ferroelectric liquid crystal or a bistable nematic liquid crystal having a narrower cell gap on the order of 1–3 $\mu$m, a cell gap change or distribution can exert a serious effect on the drive performances, such as a drive margin as disclosed in EP-A 0406705. For the purpose of maintaining a uniform cell gap, it has been a general practice to disperse spacer particles and/or adhesive particles between the substrates.

However, in a liquid crystal device of a conventional structure as described above, it has become difficult to maintain a uniform cell gap of 2 $\mu$m or below only by dispersing the adhesive particles, etc., in some cases. The failure in maintenance of a uniform cell gap may be caused by some reasons including one that the liquid crystal injection pressure at the time of liquid crystal injection can exert a force exceeding an adhesive force given by the adhesive particles for bonding the substrates to each other. An increased adhesion force by the adhesive particles may be conceived to solve the problem.

The cell gap irregularity can also be caused by irregular adhesion of oppositely disposed substrates to each other, which is liable to result in insufficiency of evaluation of the panel or cell, degassing from organic films and discharge of adsorbed gas according to a vacuum treatment prior to the liquid crystal injection. The irregular adhesion of the substrates per se can occur at a considerable frequency particularly in case where the color filter protective film comprises an organic material and the electrodes are coated with an organic insulating material.

Describing in further detail the difficulty, in an ordinary substrate application step, a pair of substrates are pressed to each other so that they approach each other down to a gap close to the size of the spacer. During the pressure application, a sealing agent applied to the periphery of one substrate in a pattern defining a liquid crystal injection port is cured at an elevated temperature.

However, under application of such a pressure, at a portion remote from the sealing agent or particularly at a portion remote from the sealing agent outside the region of the liquid crystal injection port where the sealing agent is not disposed, an exposed organic film on one substrate can adhere to the opposite substrate to form a closed space. The adhesion occurs at an early stage of the application step so that the expansion of the closed space can occur at a temperature increase in a later stage to cause a local broadening of the cell gap and result in a cell gap irregularity.

The cell gap irregularity for the above reason is liable to occur on the liquid crystal-injection port side of a liquid crystal device so that it is necessary to suppress the cell gap irregularity on the injection port side to suppress a cell gap distribution over the entire planar extension of the device in order to attain sufficient drive performances over a wide temperature range, particularly a sufficient drive margin.

SUMMARY OF THE INVENTION

In view of the above-mentioned problems of the prior art, a principal object of the present invention is to provide a liquid crystal device having a uniform cell gap over the planar extension thereof and a process for production thereof.

According to the present invention, there is provided a liquid crystal device, comprising a pair of substrates oppositely disposed with adhesive particles dispersed between the substrates, a sealing member disposed along a periphery of the substrates while leaving a liquid crystal injection port to be later sealed, and a liquid crystal disposed in a region surrounded by the sealing member and the liquid crystal injection port later sealed, wherein the region surrounded by the sealing member for disposing the liquid crystal is divided into a rectangular first region for effective optical modulation and a second region surrounding the first region not contributing to substantial optical modulation, and the adhesive particles are disposed in a dispersed state in the first region and selectively at a portion of the second region along a side of the substrates provided with the liquid crystal injection port.

According to another aspect of the present invention, there is provided a process for producing a liquid crystal device of the type comprising a pair of substrates oppositely disposed with adhesive particles dispersed between the substrates, a sealing member disposed along a periphery of the substrates while leaving a liquid crystal injection port to be later sealed, and a liquid crystal disposed in a region surrounded by the sealing member and the liquid crystal injection port later sealed, wherein the region surrounded by the sealing member for disposing the liquid crystal is divided into a rectangular first region for effective optical modulation and a second region surrounding the first region not contributing to substantial optical modulation;

said process comprising the steps of:

dispersing adhesive particles in a region corresponding to said first region and at a portion corresponding to a portion of said second region along a side provided with the liquid crystal injection port of either one of the substrates, forming a sealing member onto either one substrate so as to define the region for disposition of the liquid crystal except for a part forming the liquid crystal injection port, and applying to each other the pair of substrates including one on which the adhesive particles have been dispersed and one on which the sealing member has been formed.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
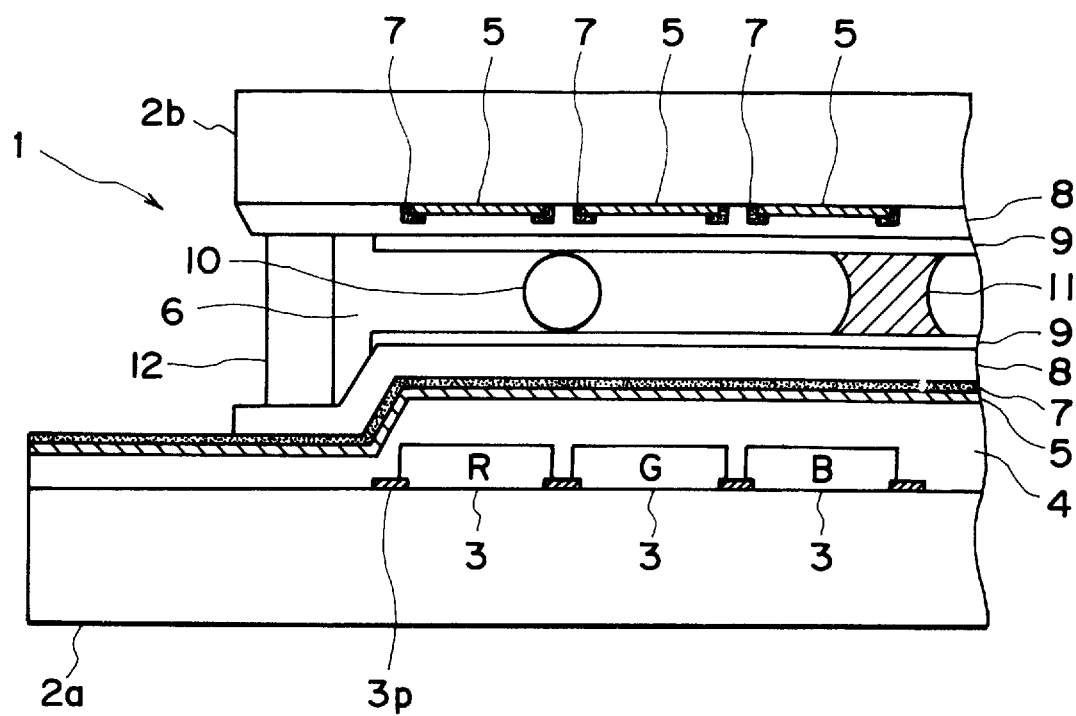
FIG. 1 is a partial sectional view of a liquid crystal device according to an embodiment of the invention.

FIG. 1 is a partial sectional view of a liquid crystal device according to a first embodiment of the present invention. Referring to FIG. 1, a liquid crystal device (liquid crystal panel) 1 includes a pair of transparent glass substrates 2a and 2b which are provided with members described hereinafter and are disposed opposite to each other so as to sandwich a liquid crystal disposed therebetween. One substrate 2a is provided with a color filter 3 comprising color filter segments of three colors of red (R), green (G) and blue (B). Spacings between the color filter segments are masked with a masking layer 3p of, e.g., a metal, and the color filter 3 is coated with a protective film 4 formed by application of an organic resin, such as an epoxy acrylate resin, so as to smoothen a stepwise height difference between the segments down to preferably 0.1 μm or less. Transparent electrodes 5 of, e.g., ITO are disposed on both substrates in the form of stripes, and auxiliary electrodes 7 of a metal, such as Al, are disposed along edges of the transparent electrodes 5. The electrodes 5 and 7 on both substrates are further coated with a short circuit-preventing insulating film 8 of, e.g., tantalum oxide and an alignment film 9 of an organic material, such as polyimide, or an inorganic material. Between the substrates 2a and 2b, spacer beads 10 for determining a gap between the substrates and adhesive particles 11 for bonding the substrates to prevent a cell gap change, are dispersed. Further, along a periphery of and between the substrates 2a and 2b, a sealing member 12 is disposed and cured so as to bond the substrates 2a and 2b and define a region for filling with the liquid crystal. The spacer beads 10 and the adhesive particles 11 can be replaced by adhesive particles also functioning as a spacer.

The liquid crystal 6 used in the liquid crystal device 1 may be selected from various liquid crystal materials including ferroelectric or anti-ferroelectric chiral smectic liquid crystals and nematic liquid crystals.

Figure 2:
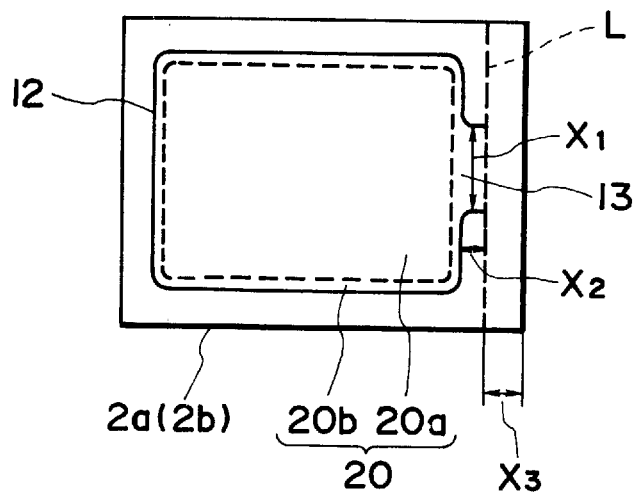
FIG. 2 is a plan view of a liquid crystal device according to an embodiment of the invention.

FIG. 2 is a plan view of the liquid crystal device according to the above embodiment. As shown in FIG. 2, the liquid crystal 6 is held in a region 20 surrounded by the sealing member 12 formed along a periphery of the substrates 2a and 2b and the liquid crystal injection port 13 later sealed up. The region 20 is divide into a rectangular first region 20a contributing to effective optical modulation (hereinafter called "optical modulation region") and a second region 20b disposed outside and preferably surrounding the first region 20a and not contributing to effect optical modulation. The second region 20b not contributing to effective optical modulation may be disposed along the periphery of and so as to surround the first region 20a in order to stabilize the alignment of the liquid crystal in the first region 20a.

Figure 3:
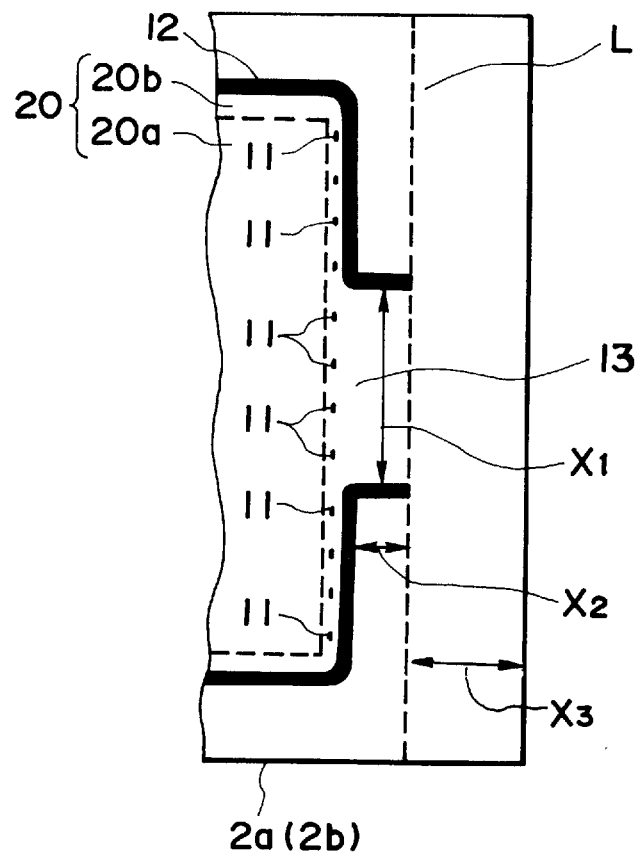
FIGS. 3 to 5 are partial plan views in the neighborhood of a liquid crystal-injection port of liquid crystal devices according to first to third embodiments, respectively, of the invention.

In this embodiment, the adhesive particles 11 are disposed not only in the optical modulation region 20a but also at a region in proximity to the liquid crystal injection port 13 in the second region 20b (preferably at a portion of the second region along a side provided with the liquid crystal injection port) as shown in FIG. 3, thereby preventing a gap failure at the time of application of the substrates. Incidentally, in FIG. 3, the adhesive particles 11 disposed in the optical modulation region 20a are omitted from showing.

The adhesive particles 11 may comprise a curable resin, particularly thermosetting resin, such as epoxy resin and acrylic resin, providing a cured product not adversely affecting the liquid crystal. The adhesive particles may have a diameter of ca. 2–10 μm while it can depend on the liquid crystal operation mode and the device structure. The adhesive particles 11 may preferably be disposed at a dispersion density of ca. 50–150 particles/mm$^2$ while it can depend on the particle size and adhesive force of the adhesive particles 11, and the cell gap. Too large a dispersion density can cause the occurrence of alignment defects in the liquid crystal 6 arising from the adhesive particles 11. Too small a dispersion density can result in a shortage of adhesion leading to peeling of the substrates during the injection process, etc. and failure in providing a uniform cell gap.

A liquid crystal device 1 using a ferroelectric liquid crystal or a bistable chiral nematic liquid crystal may preferably have a cell gap of 0.5–5 μm. In case of using such a liquid crystal material at a cell gap of 2.5 μm or smaller, a cell gap charge exceeding 0.2 μm can seriously affect the drive margin. For this reason, the dispersion density of the adhesive particles 11 may be set to 60–120 particles/mm$^2$ to suppress a cell gap to at most 0.2 μm.

By dispersing the adhesive particles at such a dispersion density at a region in proximity to the liquid crystal injection port outside the optical modulation region 20a, the cell gap uniformity over the planar extension may be kept constant. In order to provide a better cell gap uniformity, it is preferred to set a higher dispersion density at such an liquid crystal injection port proximity region than in the optical modulation region.

Next, a process for producing a liquid crystal device having a structure as descried with reference to FIGS. 1 and 2 will be described.

First, a transparent glass substrate 2a is provided with a patterned masking layer 3p and, between the patterned mask regions 3p, color filter segments of R (red), G (green) and B (blue) are successively formed by lithography to form a color filter pattern 3 having a sectional structure as shown in FIG. 1. Then, the color filter pattern 3 is coated with a smoothening layer 4, on which stripe-shaped transparent electrodes 5 and auxiliary electrodes 7 in a pattern corresponding to the color filter pattern are formed, e.g., by photolithography. Then, the transparent electrodes 5 and the auxiliary electrodes 7 are further coated with an insulating film 8 and an alignment film 9 of, e.g., polyimide, followed by rubbing in an ordinary manner.

Then, on the alignment film 9 on the substrate 2a, adhesive particles 11 are dispersed. In this instance, on the substrate 2a, the optical modulation region 20a and the second region 20b outside the region 20a are set, and adhesive particles 11 are dispersed at a dispersion density as described above selectively in the entirety of the optical modulation region 20a and at a portion alone one side to be provided with the liquid crystal injection port 13 in the region 20*b* by means of a masking member, etc.

On the other hand, another transparent glass substrate 20*b* is provided with stripe-shaped transparent electrodes 5, auxiliary electrodes 7, an insulating film 8 and an alignment film 9 (which may be rubbed as desired) similarly as on the substrate 2*a*.

Then, along a periphery of the substrate 2*b*, sealing member 12 (before curing) is applied by printing in a pattern so as to define an optical modulation region 20*a* an a second region 20*b* outside the region 20*a* while leaving a liquid crystal injection port 13 un-printed. Further, on the alignment film 9 on the substrate 2*b*, spacer beads 10 are dispersed at a prescribed density as desired.

Then, the thus-treated substrates 2*a* an 2*b* are applied to each other under application of heat and pressure with their alignment films 9 opposing each other so that their stripe transparent electrodes 5 cross each other to form an electrode matrix, thereby forming a blank cell or panel having a prescribed cell gap and planar pattern as shown in FIG. 2 wherein the adhesive particles 11 are dispersed selectively in the region 20*a* and a portion of the region 20*b* along a side provided with the liquid crystal injection port 13 (as shown in FIG. 3).

Then, a liquid crystal material is injected into the blank cell through the injection port 13, followed by sealing of the injection port with an adhesive or sealing agent, such as an epoxy resin, similar to the one constituting the sealing member 12 to complete a liquid crystal device.

Incidentally, the adhesive particles 11, the spacer particles 10 and the sealing member 12 can be disposed or applied on either of the substrates 2*a* and 2*b*, but it is preferred to disperse the adhesive particles 11 and the spacer particles 12 on separate substrates.

Further, at an appropriate point of time before or after the liquid crystal injection, a peripheral unnecessary portion of the mutually applied substrates 2*a* and 2*b* may be cut off, e.g., along a line L shown in FIG. 2.

Next, a second embodiment of the liquid crystal device according to the present invention will be described with reference to its production process.

In this embodiment, similarly as in the process for producing the first embodiment of liquid crystal device, one substrate 2*a* is provided with a color filter 3, electrodes 5 and 7, an insulating film 8 and an alignment film 9, and the other substrate 2*b* is provided with electrodes 5 and 7, an insulating film 8 and an alignment film 9, i.e., except for the color filter 3.

Figure 4:
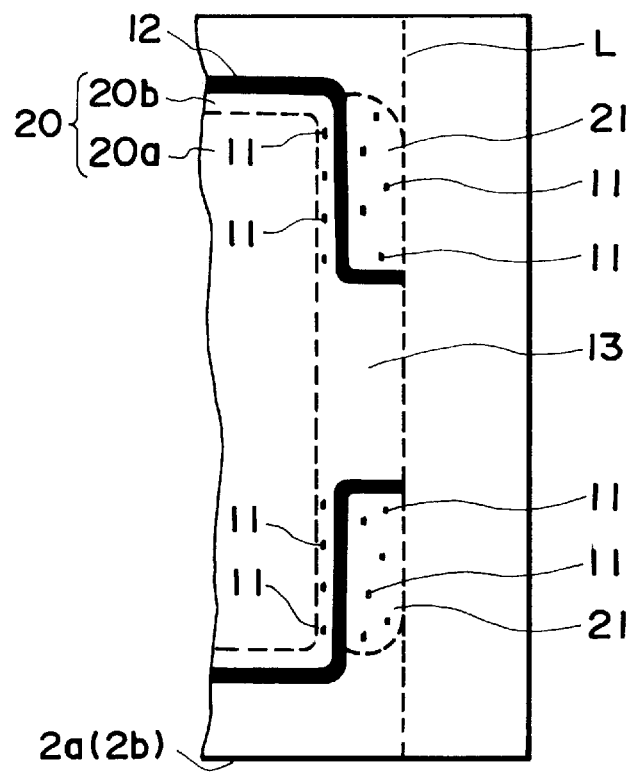

Then, spacer beads 10 are dispersed on one of the substrates 2*a* an 2*b*, adhesive particles 11 are dispersed on the other substrate, and a sealing member 12 is applied in a pattern as shown in FIG. 2 on either substrate. Now, in this embodiment, adhesive particles 11 are disposed not only in the optical modulation region 20*b* and at a portion in proximity to the liquid crystal injection port of the region 20*b* but also at a portion 21 outside the liquid crystal injection region 20 (i.e., outside the region 20 to be surrounded by the sealing member 12) except for the region forming the liquid crystal injection port 13 as shown in FIG. 4.

After dispersing the adhesive particles 11, the substrates 2*a* and 2*b* are applied to each other under application of a heat and a pressure, a liquid crystal 6 is injected into the region 20, and then the liquid crystal injection port 13 is sealed to complete a liquid crystal device 1.

According to this embodiment, the bonding strength between the substrates is particularly enhanced in the neighborhood of the liquid crystal injection port 13 to uniformize the cell gap.

Next, a third embodiment of the liquid crystal device according to the present invention will be described.

Similarly as in the first and second embodiments, two substrates 2*a* and 2*b* are provided with a color filter layer 3 (on the substrate 2*a* only), electrodes 5 and 7, an insulating film 8 and an alignment film 9. Then, spacer beads 10 are dispersed on one of the substrates 2*a* and 2*b*, adhesive particles are dispersed on the other substrate, and a sealing member 12 is applied in a pattern as shown in FIG. 2 on either substrate.

Figure 5:
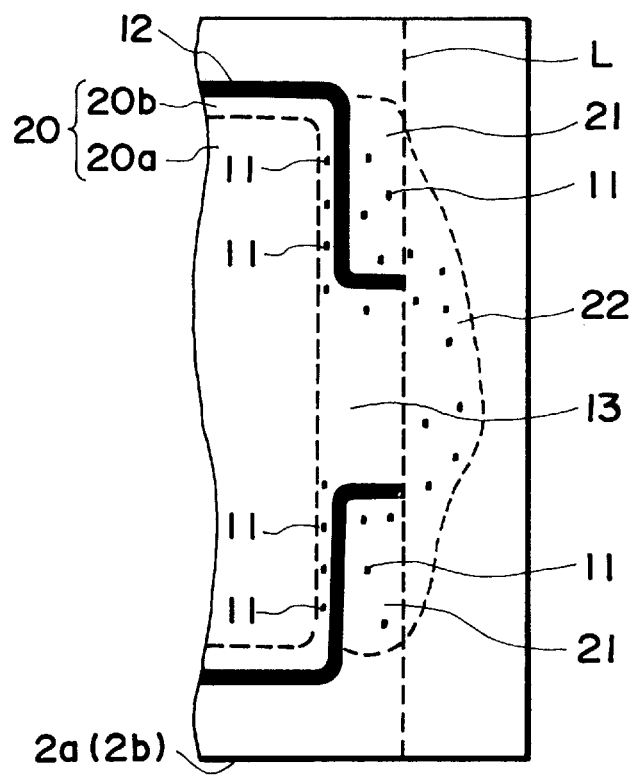

In this instance, adhesive particles 11 are dispersed in the optical modulation region 20*a*, at a portion in proximity to the liquid crystal injection port of the region 20*b*, at a portion 21 outside the sealing member 12 and also at a portion 22 (surrounded by a dashed line) of the substrates outside a scribe line L to be cut off for forming a final planar shape of the liquid crystal device 1 as shown in FIG. 5. The scribe line L is generally disposed at the end of the sealing member 12 but may be deviated therefrom to some extent.

After dispersing the adhesive particles 11, the substrates 2*a* and 2*b* are applied to each other under application of heat and pressure and then cut along the scribe line L. Then, a liquid crystal 6 is injected into the region 20 through the injection port 13, and the injection port 13 is sealed to complete a liquid crystal device 1.

In the liquid crystal device according to this embodiment, it is possible to obviate a decrease in cell gap around the injection port 13 due to a possible excessive pressure application by mean of the adhesive particles 11 dispersed at the region 22 outside the scribe line.

In the above-mentioned first to third embodiments, the dispersion density of adhesive particles at a portion close to the liquid crystal-injection port of the region 20*b* and in the region 21 or 22 outside the sealing member may be increased to a value larger than in the optical modulation region 20*a*. Preferably, the dispersion density may be larger than and at most 5 times that in the optical modulation region 20*a*, more preferably 2 to 5 times that in the optical modulation region 20*a* wherein the adhesive particles are dispersed at a density of 50–150 particles/mm$^2$.

Further, the adhesive particles in the region 20*b*, 21 or 22 may have a particle size which is larger than that in the optical modulation region 20*a*, more specifically at least the sum of the particle size of the adhesive particles in the region 20*a* and the thickness of the color filter 3, more preferably 2 to 5 times the particle size of the adhesive particles in the region 20*a*.

Figure 6:
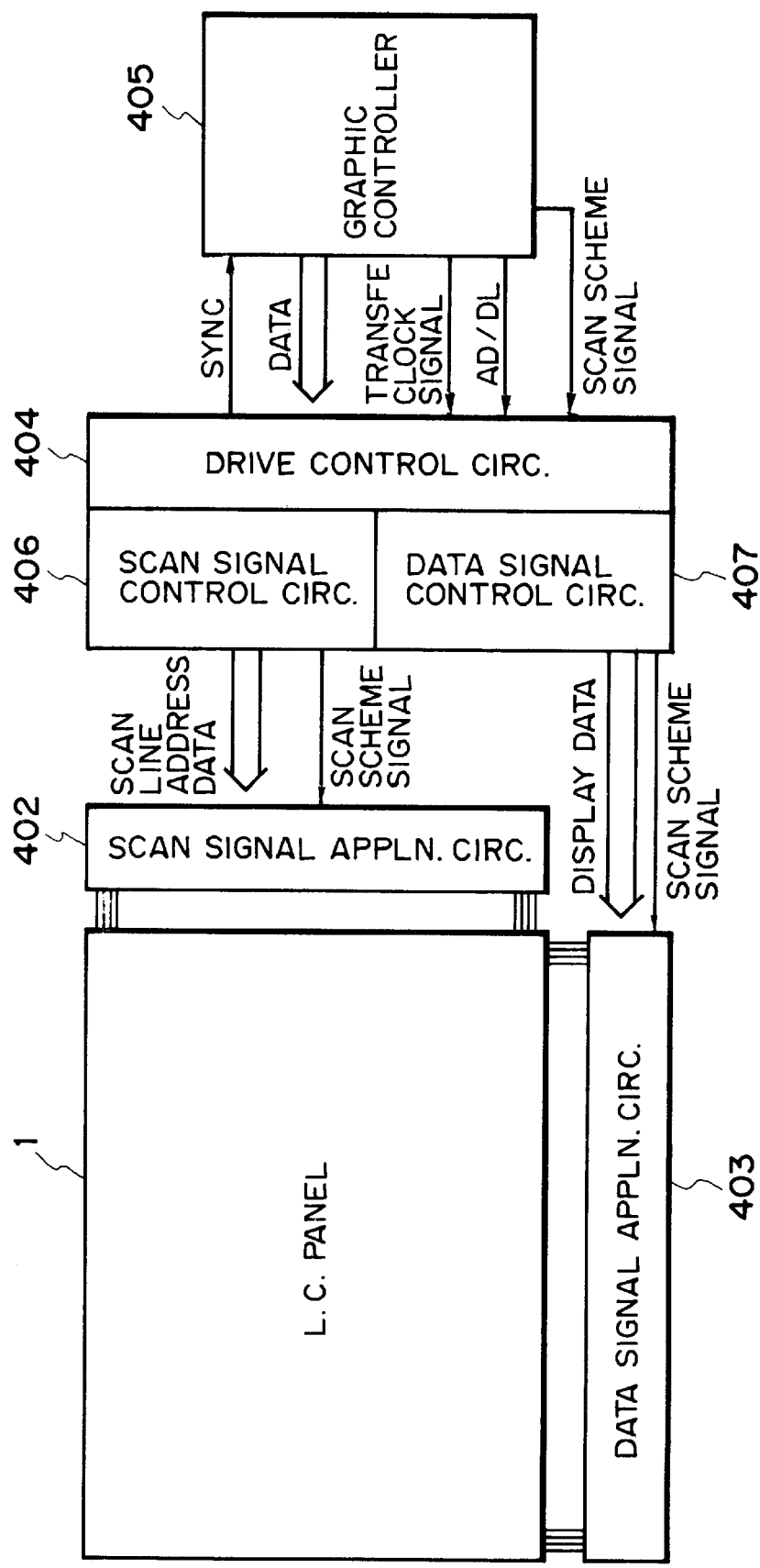
FIG. 6 is a block diagram of an example of liquid crystal apparatus including a liquid crystal device (panel) according to the invention.
Figure 7:
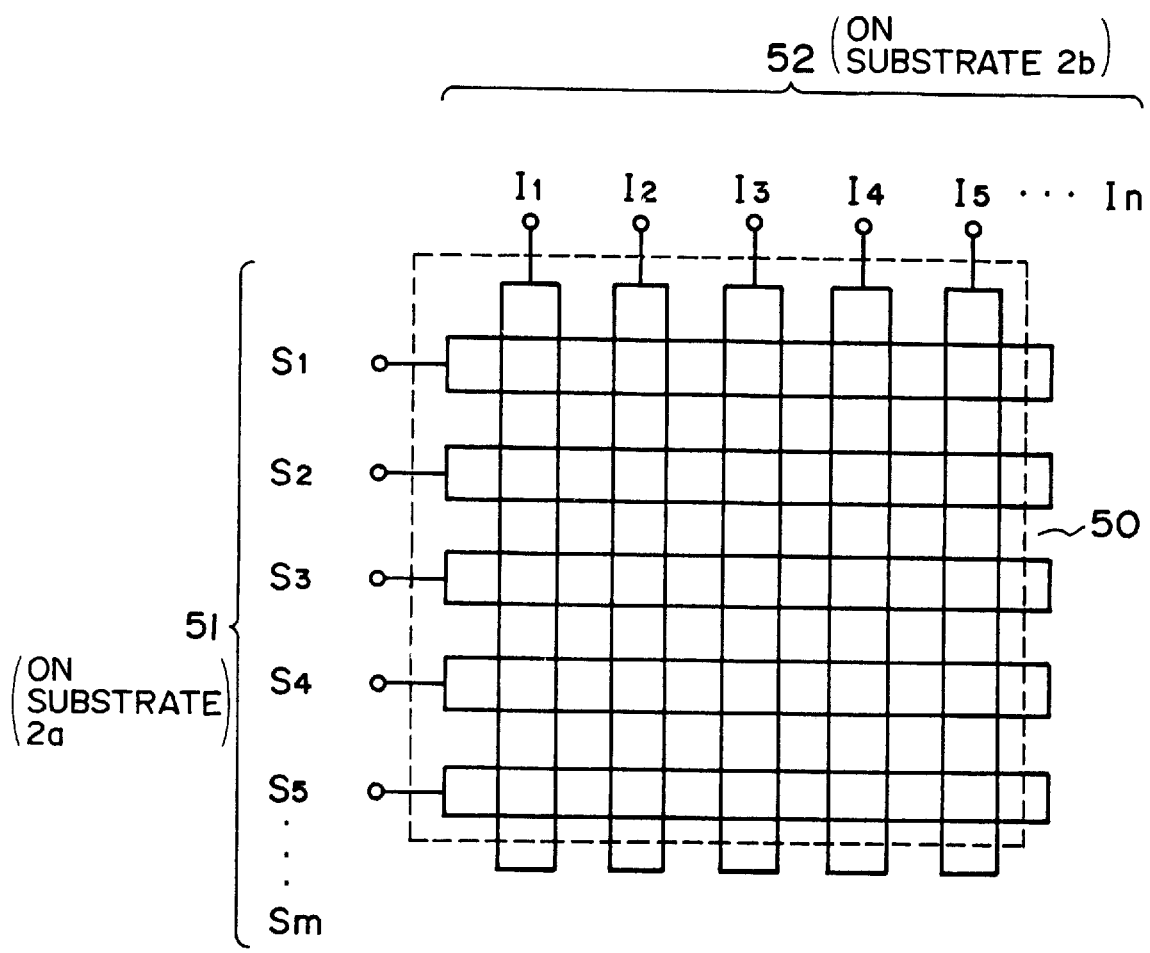
FIG. 7 is a schematic plan view for illustrating a matrix electrode structure in an embodiment of the liquid crystal device according to the invention.

The liquid crystal device according to the present invention may constitute liquid crystal apparatus having various functions. An example of such liquid crystal apparatus will be described with reference to FIG. 6. In a liquid crystal apparatus, such as a printer or a color display apparatus, including a liquid crystal device (panel) 1, the liquid crystal device 1 may have a matrix electrode structure as shown in FIG. 7 including scanning electrodes 51 ($S_1 \ldots S_m$) and data electrodes 52 ($I^1 \ldots I_n$) and may be connected to a scanning signal application circuit 402 and a data signal application circuit 403, which are further connected to a drive control circuit 404 and a graphic controller 405. From the graphic controller 405, data and a scanning scheme signal are supplied via the drive control circuit 404 to a scanning signal control circuit 406 and a data signal control circuit 407.

The data is converted into scanning line address data and display data by the scanning signal control circuit 406 and the data signal control circuit 407, respectively, and the scanning scheme signal is supplied as it is to the scanning signal application circuit 402 and the data signal application circuit 403.

The scanning signal application circuit 402 supplies a scanning signal having a waveform determined based on the scanning scheme signal to a scanning electrode ($S_1$–$S_m$ as shown in FIG. 7) determined by the scanning line address data, and the data signal application circuit 403 supplies data signals having waveforms determined based on a display content of white or black and the scanning scheme signal to the data electrodes ($I_1$–$I_n$ as shown in FIG. 7).

Next, specific examples of production and evaluation of liquid crystal devices having a structure as shown in FIGS. 1 and 2 will be described.

EXAMPLE 1

Two 1 mm-thick glass substrates each having a size of 450 mm×275 mm were provided. One glass substrate (2a) was first provided with a 1000Å-thick patterned masking layer 3p of Mo and, between patterned masking regions 3p, 1.5 μm-thick color filter segments 3 of R, G and B were formed successively with pigment-dispersed photosensitive resins ("PA-102 R, G and B", available from Ube Kosan K. K.) each by spinner coating and patterning by photolithography. Then, the color filter segments R, G and B were coated with a ca. 2 μm-thick protective layer 4 of epoxy acrylate resin (available from Shin-Nittetsu Kagaku K. K.). Then, on the protective layer 4, 700Å-thick stripe-shaped transparent electrodes 5 of ITO and totally 700Å-thick Mo alloy/aluminum-two layered auxiliary electrodes 7 in a pattern corresponding to the color filter pattern 3 were formed. Then, these electrodes 5 and 7 were coated with a 1000Å-thick insulating film of $TaO_2$ and then with a 200Å-thick polyimide alignment film 9 (formed by application and baking of a precursor ("LQ1802", available from Hitachi Kasei K. K.)), followed by rubbing in an ordinary manner.

Then, on the alignment film 9 on the substrate 2a, an optical modulation region 20a in a size of 294 mm×235 mm and a 10 mm-wide frame region 20b surrounding the optical modulation region 20a were set, and 5 μm-dia. epoxy resin-based adhesive particles ("Toraypearl", available from Toray K. K.) were dispersed at a rate of 80 particles/mm² selectively in the entirety of the region 20a and one side of the region 20a to be provided with a liquid crystal-injection port by placing a mask on the substrate 2a.

Separately, the other glass substrate 2b was similarly provided with 700Å-thick stripe-shaped transparent electrodes 5, auxiliary electrodes 7, an insulating film 8 and a rubbed alignment film 9.

Then, along a peripheral part on the substrate 2a, a thermosetting epoxy resin was printed in a pattern 12 in a width of 0.275 mm so as to define an outer boader of the above-mentioned frame region 20b of 10 mm in width in which the optical modulation region 20a of 294 mm×235 mm was set, while leaving a length X1 of 80 mm and a width X2 of 3 mm for the liquid crystal-injection port 13 (FIG. 2). Then, ca. 1.1 μm-dia. SiO beads were dispersed on the alignment film 9b on the substrate 2b at a density of 300 particles/mm² .

Then, the thus-treated substrates 2a and 2b were applied to each other so that their transparent electrodes 5 cross each other to form an electrode matrix under application of a pressure of 100 kPa, followed by heating at a rate of 3° C./min. up to 160° C., holding at 160° C. for 90 min. to cure the sealing member 12 and the adhesive particles 11, thereby forming a cell structure.

Then, a portion in a width (×3) of ca. 50 mm of the applied substrates from the edges thereof provided with the liquid crystal injection port was cut off (along a scribe line L in FIGS. 2 and 3) to expose the injection port at the cut edges of the substrates, thereby forming a blank cell having a cell gap of ca. 1 μm wherein the adhesive particles 11 were dispersed in the region 20a and a side portion along the liquid crystal injection port 13 of the frame region 20b.

The thus-formed blank cell was provided with an electrode matrix 50 as schematically shown in FIG. 7, comprising transparent electrodes 51 formed on the substrate 2a functioning as scanning electrodes ($S_1$, $S_2$ . . . $S_m$) and transparent electrodes 52 formed on the substrate 2b functioning as data electrodes ($I_1$, $I_2$, . . . $I_n$).

Then, the blank cell was placed in a vacuum vessel under a reduced pressure and the injection port thereof was caused to contact a phenylpyrimidine-based chiral smectic liquid crystal stored in a liquid crystal pan in the vacuum vessel and heated to its isotropic phase:

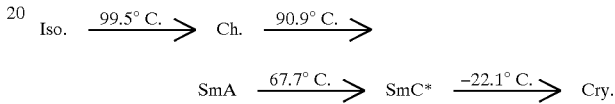

Then, the pressure in the vacuum vessel was gradually restored to atmospheric pressure, the cell was heated to a cholesteric temperature, and then the pressure in the vessel was raised to 1900 Torr and held at that pressure for 12 hours, followed by gradual restoration of normal pressure and temperature, to complete the liquid crystal filling in the cell.

Then, an excess of the liquid crystal attached to the vicinity of the injection port was wiped out, and the injection port was sealed up with a two liquid-type adhesive ("STRUCTBOND EW-460NF", available from Mitsui Toatsu Kagaku K. K.), thereby completing a liquid crystal device having a sectional structure as shown in FIG. 1.

Five points set within the optical modulation region 20a were selected at equal spacings along a central line (a horizontal line in FIG. 2) passing through the injection port on the liquid crystal cell, and the retardation was measured at the five points by a retardation meter ("RA 100, available from OLYMPUS K. K.) to determine the cell gaps thereat, whereby a maximum cell gap (at a point closest to the injection port) and a minimum cell gap (at a farthest from the injection port) gave a difference from therebetween of ca. 600Å.

Figure 8:
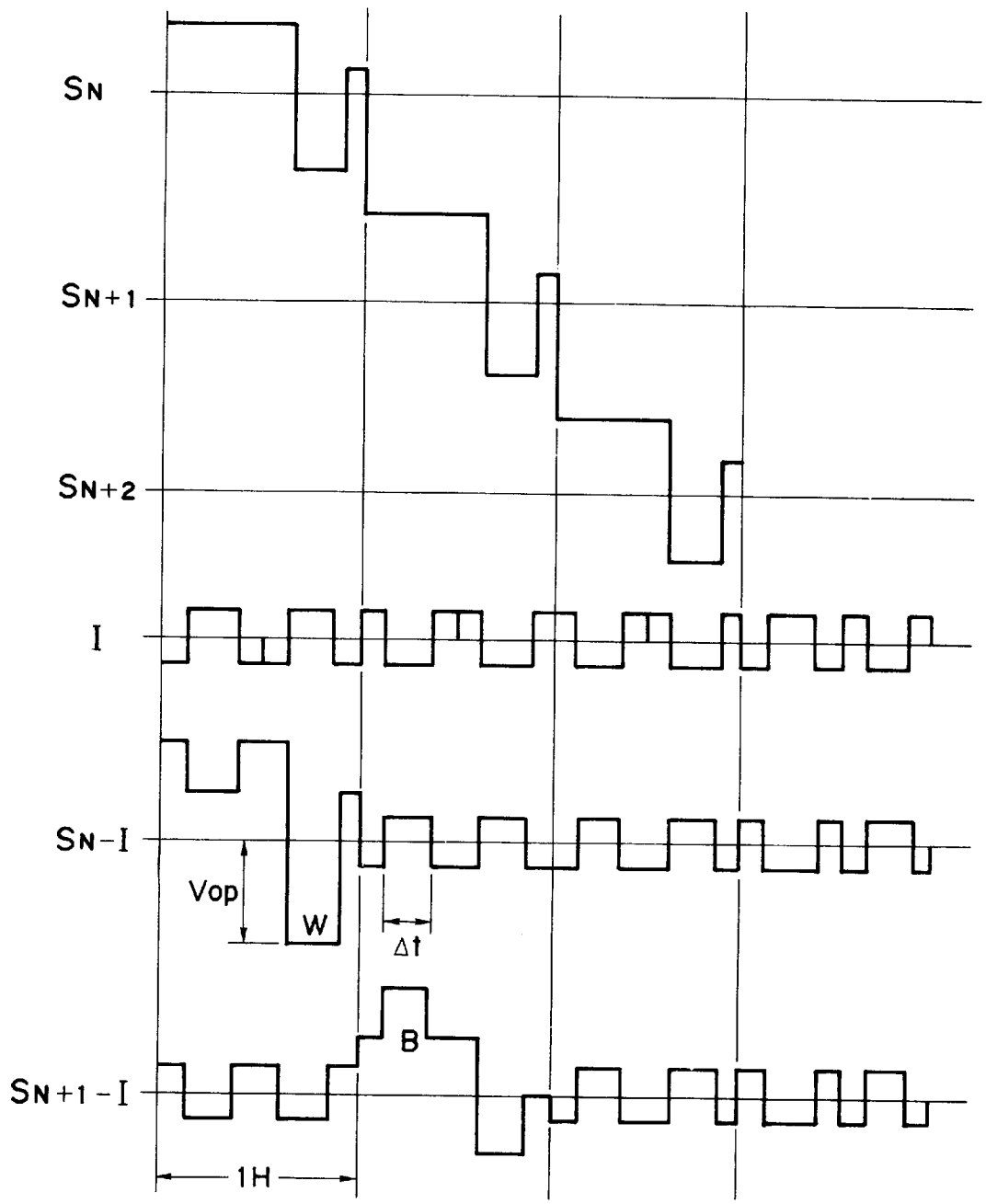
FIG. 8 is a waveform diagram for illustrating a time-serial drive waveform used for evaluating drive performances in experimental examples.
Figure 9:
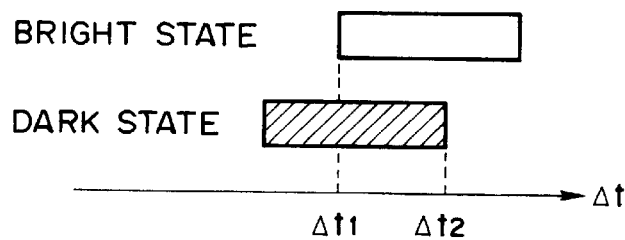
FIG. 9 is an explanatory view for illustrating a drive margin.

The liquid crystal cell was then sandwiched between a pair of right angle cross nicol polarizers and subjected to a multiplex drive by using a set of time serial drive waveforms shown in FIG. 8 including scanning signals shown at $S_N$, $S_{N+1}$ and $S_{N+2}$, data signals shown at I and pixel signals shown at $S_{N-I}$ and $S_{N+1}$–I under the conditions of Vop (=$V_S$+$V_I$)=20 volts, a bias ratio of ⅓.3 and a duty factor of ¹⁄₁₀₀₀. Under the conditions, the application pulse width At was gradually changed to write in a bright state (white) and a dark state (black) at the above-mentioned five points for the cell gap measurement, thus determining pulse width (At) ranges allowing writing in bright and dark states as shown in FIG. 9 for the respective points. For example, from data as shown in FIG. 9 including a minimum pulse width $\Delta t_1$ for writing both bright and dark and a maximum pulse width $\Delta t_2$ for writing both dark and bright, a drive margin M2 is calculated according to the following definition equation:

$$M2=(\Delta t_2-\Delta t_1)/(\Delta t_2-\Delta t_1).$$

More specifically, FIG. 9 illustrates a range of At allowing a bright display at a pixel $S_N$–I and a range of Δt allowing a dark display at a pixel $S_{N+1}$–I at a fixed voltage Vop. As described above, $\Delta t_1$ as a maximum pulse width for commonly allowing both bright and dark write and $\Delta t_2$ as a maximum pulse width for commonly allowing both bright and dark are used to define the drive margin M2. The duty factor (1/1000) represents a ratio of one line selection period (1 H) to one cycle period (one frame).

The above drive margin (M2) measurement was performed while changing the temperature within a range of 10°–40° C., and a drive margin temperature range (a temperature range giving a drive margin M2≧0.2 at all the five points) was measured. As a result, the above-prepared liquid crystal device gave a drive margin temperature range of 5° C.

EXAMPLE 2

A liquid crystal device was prepared in the same manner as in Example 1 except that the adhesive particles were dispersed only in the optical modulation region 20a in FIG. 2 and not at the side portion of the region 20b along the injection port 13.

As a result of measurement of cell gap distribution and drive margin temperature characteristic performed in the same manner as in Example 1, the liquid crystal device exhibited a cell gap difference of ca. 1200Å between a maximum value at the point closest to the injection port and a minimum value at the farthest point from the injection port, and a drive margin temperature range (giving M2≧0.2 at all the five measurement points) of 2° C.

EXAMPLE 3

A liquid crystal device was prepared in the same manner as in Example 1 except that the adhesive particles were dispersed only in the side region along the injection port of the region 20b at a density of 160 particles/mm², i.e., twice 80 particles/mm² in the optical modulation region 20a.

As a result of measurement of cell gap distribution and drive margin temperature characteristic performed in the same manner as in Example 1, the liquid crystal device exhibited a cell gap difference of ca. 500Å between a maximum value at the point closest to the injection port and a minimum value at the farthest point from the injection port, and a drive margin temperature range (giving M2≧0.2 at all the five measurement points) of 7° C.

EXAMPLE 4

A liquid crystal device was prepared in the same manner as in Example 1 except that the size of adhesive particles dispersed in the side region along the injection port of the region 20b was increased to 10 μm.

As a result of measurement of cell gap distribution and drive margin temperature characteristic performed in the same manner as in Example 1, the liquid crystal device exhibited a cell gap difference of ca. 500Å between a maximum value at the point closest to the injection port and a minimum value at the farthest point from the injection port, and a drive margin temperature range (giving M2≧0.2 at all the five measurement points) of 7° C.

EXAMPLE 5

A liquid crystal device was prepared in the same manner as in Example 1 except that the adhesive particles were dispersed in the entirety of the optical modulation region 20a, the side region 20b except for a portion thereof directly adjacent the injection port and a region 21 outside the sealing member 12 as shown in FIG. 4.

As a result of measurement of cell gap distribution and drive margin temperature characteristic performed in the same manner as in Example 1, the liquid crystal device exhibited a cell gap difference of ca. 600Å between a maximum value at the point closest to the injection port and a minimum value at the farthest point from the injection port, and a drive margin temperature range (giving M2≧0.2 at all the five measurement points) of 7° C.

EXAMPLE 6

A liquid crystal device was prepared in the same manner as in Example 5 except that the adhesive particles were dispersed in the regions 20b and 21 at a density twice that in the optical modulation region 20a.

As a result of measurement of cell gap distribution and drive margin temperature characteristic performed in the same manner as in Example 1, the liquid crystal device exhibited a cell gap difference of ca. 500Å between a maximum value at the point closest to the injection port and a minimum value at the farthest point from the injection port, and a drive margin temperature range (giving M2≧0.2 at all the five measurement points) of 8° C.

EXAMPLE 7

A liquid crystal device was prepared in the same manner as in Example 5 except that the size of the adhesive particles dispersed in the regions 20b and 21 was increased to 10 μm.

As a result of measurement of cell gap distribution and drive margin temperature characteristic performed in the same manner as in Example 1, the liquid crystal device exhibited a cell gap difference of ca. 500Å between a maximum value at the point closest to the injection port and a minimum value at the farthest point from the injection port, and a drive margin temperature range (giving M2≧0.2 at all the five measurement points) of 8° C.

EXAMPLE 8

A liquid crystal device was prepared in the same manner as in Example 1 except that the adhesive particles were dispersed only in the entirety of the optical modulation region 20a, the side region 20b except for a portion thereof directly adjacent to the injection port, a region 21 outside the sealing member 12 and a region 22 outside the injection port 13 to be cut off before the liquid crystal injection as shown in FIG. 5.

As a result of measurement of cell gap distribution and drive margin temperature characteristic performed in the same manner as in Example 1, the liquid crystal device exhibited a cell gap difference of ca. 400Å between a maximum value at the point closest to the injection port and a minimum value at the farthest point from the injection port, and a drive margin temperature range (giving M2≧0.2 at all the five measurement points) of 9° C.

EXAMPLE 9

A liquid crystal device was prepared in the same manner as in Example 8 except that the size of the adhesive particles dispersed in the regions 20b and 21 was increased to 10 μm.

As a result of measurement of cell gap distribution and drive margin temperature characteristic performed in the same manner as in Example 1, the liquid crystal device exhibited a cell gap difference of ca. 400Å between a maximum value at the point closest to the injection port and a minimum value at the farthest point from the injection port, and a drive margin temperature range (giving M2≧0.2 at all the five measurement points) of 9° C.

EXAMPLE 10

A liquid crystal device was prepared in the same manner as in Example 8 except that the size of the adhesive particles dispersed in the regions 20b, 21 and 22 was increased to 10 μm.

As a result of measurement of cell gap distribution and drive margin temperature characteristic performed in the same manner as in Example 1, the liquid crystal device exhibited a cell gap difference of ca. 400Å between a maximum value at the point closest to the injection port and a minimum value at the farthest point from the injection port, and a drive margin temperature range (giving $M2 \geq 0.2$ at all the five measurement points) of 9° C.

EXAMPLE 11

A liquid crystal device was prepared in the same manner as in Example 1 except that the particle size of the spacer beads was increased to 2.6 µm, adhesive particles of 8 µm in particle size were dispersed at a density of 80 particles/mm² in the region 20b and adhesive particles of 20 µm in particle size were dispersed at a density of 100 particles/mm² in the region 20b.

As a result of measurement of cell gap distribution and drive margin temperature characteristic performed in the same manner as in Example 1, the liquid crystal device exhibited a cell gap difference of ca. 500Å between a maximum value at the point closest to the injection port and a minimum value at the farthest point from the injection port, and a drive margin temperature range (giving $M2 \geq 0.2$ at all the five measurement points) of 9° C.

As described above, according to the present invention, it has become possible to provide a liquid crystal device wherein the cell gap is uniformized in proximity to the liquid crystal injection port and a broad drive margin is provided by dispersing adhesive particles not only in an optical modulation region (first region) but also preferentially to a side portion along the injection of a frame region surrounding the optical modulation region.

What is claimed is:

1. A liquid crystal device, comprising a pair of substrates oppositely disposed with adhesive particles dispersed between the substrates, a sealing member disposed along a periphery of the substrates while leaving a liquid crystal injection port to be later sealed, and a liquid crystal disposed in a region surrounded by the sealing member and the liquid crystal injection port later sealed, wherein
the region surrounded by the sealing member for disposing the liquid crystal is divided into a rectangular first region for effective optical modulation and a second region surrounding the first region not contributing to substantial optical modulation, and the adhesive particles are disposed in a dispersed state in the first region and selectively at a portion of the second region along a side of the substrates provided with the liquid crystal injection port.

2. A liquid crystal device according to claim 1, wherein the adhesive particles are disposed at a higher density at said portion of the second region than in the first region.

3. A liquid crystal device according to claim 1, wherein the adhesive particles disposed at said portion of the second region have a large average particle size than the adhesive particles disposed in the first region.

4. A liquid crystal device according to claim 1, wherein at least one of said substrates is provided with a color filter pattern and a protective film coating the color filter pattern.

5. A liquid crystal device according to claim 4, wherein said protective film comprises epoxy acrylate resin.

6. A liquid crystal device according to claim 1, wherein the adhesive particles are additionally disposed at a marginal region along a side of the substrates provided with the liquid crystal injection port and outside the sealing member.

7. A liquid crystal device according to claim 1, wherein the adhesive particles disposed in the second region are disposed along the side of the substrates except for a portion thereof directly adjacent to the liquid crystal injection port.

8. A liquid crystal device according to claim 7, wherein the adhesive particles are additionally disposed at a marginal region along a side of the substrates provided with the liquid crystal injection port and outside the sealing member.

9. A liquid crystal device according to claim 8, wherein the adhesive particles are disposed at a higher density at the second region and the marginal region than in the first region.

10. A liquid crystal device according to claim 8, wherein the adhesive particles disposed at the second region and the marginal region have a larger particle size than the adhesive particles disposed in the first region.

11. A liquid crystal device according to claim 1, wherein the adhesive particles are disposed at a density in a range of 50–150 particles/mm² in the first region.

12. A liquid crystal device according to claim 1, wherein said adhesive particles comprise epoxy resin.

13. A liquid crystal device according to claim 1, wherein spacer beads are disposed in a dispersed state together with the adhesive particles.

14. A liquid crystal device according to claim 1, wherein said liquid crystal comprises a chiral smectic liquid crystal.

15. A liquid crystal device according to claim 14, wherein said pair of substrates are disposed with a cell gap of at most 2.5 µm therebetween.

16. A liquid crystal device, comprising a pair of substrates oppositely disposed with adhesive particles dispersed between the substrates, a sealing member disposed along a periphery of the substrates while leaving a liquid crystal injection port to be later sealed, and a liquid crystal disposed in a region surrounded by the sealing member and the liquid crystal injection port later sealed, wherein
the adhesive particles are disposed in a dispersed state in the region surrounded by the sealing member and at a marginal region along a side of the substrates provided with the liquid crystal injection port and outside the sealing member.

17. A process for producing a liquid crystal device according to claim 1, comprising the steps of:
dispersing adhesive particles in a region corresponding to said first region and at a portion corresponding to a portion of said second region along a side provided with the liquid crystal injection port of either one of the substrates,
forming a sealing member onto either one substrate so as to define the region for disposition of the liquid crystal except for a part forming the liquid crystal injection port, and
applying to each other the pair of substrates including one on which the adhesive particles have been dispersed and one on which the sealing member has been formed.

18. A process according to claim 17, wherein the pair of substrates are applied to each other under application of heat and pressure.

19. A process according to claim 17, wherein the pair of substrates applied to each other are subjected to cutting-off of a marginal portion thereof along a line passing outside the sealing member so as to expose the liquid crystal injection port at their cut edges.

20. A process according to claim 17, wherein the adhesive particles are disposed at a higher density at said portion of the second region than in the first region.

21. A process according to claim 17, wherein the adhesive particles disposed at said portion of the second region have a large average particle size than the adhesive particles disposed in the first region.

22. A process according to claim 17, further including a step of forming a color filter pattern on at least one of said pair of substrates and a step of coating the color filter pattern with a protective film.

23. A process according to claim 22, wherein said protective film comprises epoxy acrylate resin.

24. A process according to claim 17, wherein the adhesive particles are additionally disposed at a marginal region along a side of the substrates provided with the liquid crystal injection port and outside the sealing member.

25. A process according to claim 17, wherein the adhesive particles disposed in the second region are disposed along the side of the substrates except for a portion thereof directly adjacent to the liquid crystal injection port.

26. A process according to claim 25, wherein the adhesive particles are additionally disposed at a marginal region along a side of the substrates provided with the liquid crystal injection port and outside the sealing member.

27. A process according to claim 26, wherein the adhesive particles are disposed at a higher density at the second region and the marginal region than in the first region.

28. A process according to claim 26, wherein the adhesive particles disposed at the second region and the marginal region have a larger particle size than the adhesive particles disposed in the first region.

29. A process according to claim 17, wherein the adhesive particles are disposed in the second region along the side of the substrates except for a portion thereof directly adjacent to the liquid crystal injection port and at a marginal region on the substrate along a side thereof provided with the liquid crystal injection port outside the sealing port, and after the application of the substrates, a marginal portion of the substrates outside the sealing member is cut off to expose the liquid crystal injection port at cut edges of the substrates.

* * * * *

UNITED STATES PATENT AND TRADEMARK OFFICE
CERTIFICATE OF CORRECTION

PATENT NO. : 5,858,482

DATED : January 12, 1999

INVENTOR(S) : KAZUYA ISHIWATA ET AL.

It is certified that error appears in the above-identified patent and that said Letters Patent is hereby corrected as shown below:

COLUMN 3

Line 62, "divide" should read --divided--.

COLUMN 4

Line 41, "an" should read --a--.

COLUMN 5

Line 10, "an a" should read --and a--.
Line 15, "an" should read --and--.
Line 51, "an" should read --and--.

COLUMN 6

Line 61, "$(I^1...In)$" should read --$(I_1... I_n)$--.

COLUMN 7

Line 53, "boader" should read --border--.

UNITED STATES PATENT AND TRADEMARK OFFICE
CERTIFICATE OF CORRECTION

PATENT NO. : 5,858,482

DATED : January 12, 1999

INVENTOR(S) : KAZUYA ISHIWATA ET AL.

It is certified that error appears in the above-identified patent and that said Letters Patent is hereby corrected as shown below:

COLUMN 8

Line 45, "(at a" should read --(at a point--.
Line 54, "At" should read --Δt-.
Line 57, "(At)" should read --(Δt)--.
Line 65, "At" should read --Δt-.

COLUMN 11

Line 53, "large" should read --larger--.

COLUMN 12

Line 62, "large" should read --larger--.

Signed and Sealed this

Seventh Day of December, 1999

Q. TODD DICKINSON

*Attest:*

*Attesting Officer*  *Acting Commissioner of Patents and Trademarks*